United States Patent [19]

Ezoe

[11] Patent Number: 5,523,331
[45] Date of Patent: Jun. 4, 1996

[54] RUBBER COMPOSITION DECAYABLE IN SOIL AND AN ARTICLE FOR BINDING POT SOIL THEREWITH

[75] Inventor: Shoji Ezoe, Shikama-gun, Japan

[73] Assignee: Asahi Co., Ltd., Hyogo, Japan

[21] Appl. No.: 133,109

[22] PCT Filed: Apr. 15, 1992

[86] PCT No.: PCT/JP92/00490

§ 371 Date: Dec. 20, 1993

§ 102(e) Date: Dec. 20, 1993

[87] PCT Pub. No.: WO92/18567

PCT Pub. Date: Oct. 29, 1992

[30] Foreign Application Priority Data

Apr. 19, 1991 [JP] Japan .................................. 3-117033
Apr. 19, 1991 [JP] Japan .................................. 3-117034

[51] Int. Cl.$^6$ .............................. C08L 89/00; C08L 3/00; A01G 9/02; A01G 23/02
[52] U.S. Cl. ............................ 524/25; 524/45; 524/47; 523/124; 523/128; 47/66; 47/76; 47/74; 47/73; 206/805
[58] Field of Search ................... 523/124, 128; 524/25, 45, 47; 47/66, 66 B, 76 R, 74 R, 73 F; 206/805

[56] References Cited

U.S. PATENT DOCUMENTS 2,203,701  6/1940  Shepherd ..................... 524/25
4,990,541  2/1991  Nielsen et al. .................. 521/70

FOREIGN PATENT DOCUMENTS 51-39252    4/1976   Japan .
59-132829   7/1984   Japan .
61-15626    1/1986   Japan .
63-294716   12/1988  Japan .

*Primary Examiner*—Paul R. Michl
*Assistant Examiner*—LaVonda R. DeWitt
*Attorney, Agent, or Firm*—Birch, Stewart, Kolasch & Birch

[57] ABSTRACT

A rubber composition or a rubber composite which is biodegradable in soil and is used to hold pot soil to the roots of plants to facilitate transplanting, said rubber composition containing a natural or synthetic rubber component and a water-soluble additive which does not bind to the rubber component and thus can elute into the soil.

43 Claims, 3 Drawing Sheets

RUBBER COMPOSITION DECAYABLE IN SOIL AND AN ARTICLE FOR BINDING POT SOIL THEREWITH

TECHNICAL FIELD

The present invention relates to a rubber composition which is decayable in soil, and is suitable as an article for binding pot soil stuck to the roots of transplanted plants, and including rubber bands, rubber tapes, rubber nets and binding cloth made therefrom for binding pot soil stuck to the roots of transplanted plants.

BACKGROUND ART

In the case where roots are exposed to the sun and wind during transplanting, the chance of the plant taking root is materially reduced. Then, generally, the pot soil stuck to the roots dug up are maintained, transported and buried in the hole dug at the desired location. In Japan, in order to enhance the efficiency of holding the pot soil stuck to the transported and transplanted roots of young plants such as boxwoods and azaleas, the pot soil is wrapped in hemp cloth, straw matting or straw and then bound with ropes. If the pot soil stuck to the roots is not maintained well and crumbles, the plants cannot take root after transplanting, and therefore the value of the plants as articles of commerce is materially reduced. However, a method of binding hemp cloth, straw matting or straw using rubber bands instead of the ropes is proposed for improving working efficiency. The working efficiency in the method of expanding rubber bands and binding pot soil stuck to the roots wrapped in hemp cloth, straw matting or straw, because of the elasticity of the rubber bands, is 500 plants/day and higher. Even an amateur can easily carry out the present method. In the case of using ropes, a skilled worker can only wrap 300 plants/day. Since the decay of the pot soil stuck to the roots is required to enhance the plant in taking root and to enhance the growth of the roots after transportation and transplanting, some workers bury the roots without removing the rubber bands. However, since rubber bands decay more slowly than ropes, the rubber bands are frequently removed before the roots are buried. Especially when public institutions carry out a tree planting, there are some cases where the ropes should be wound around the soil.

Figure 1:
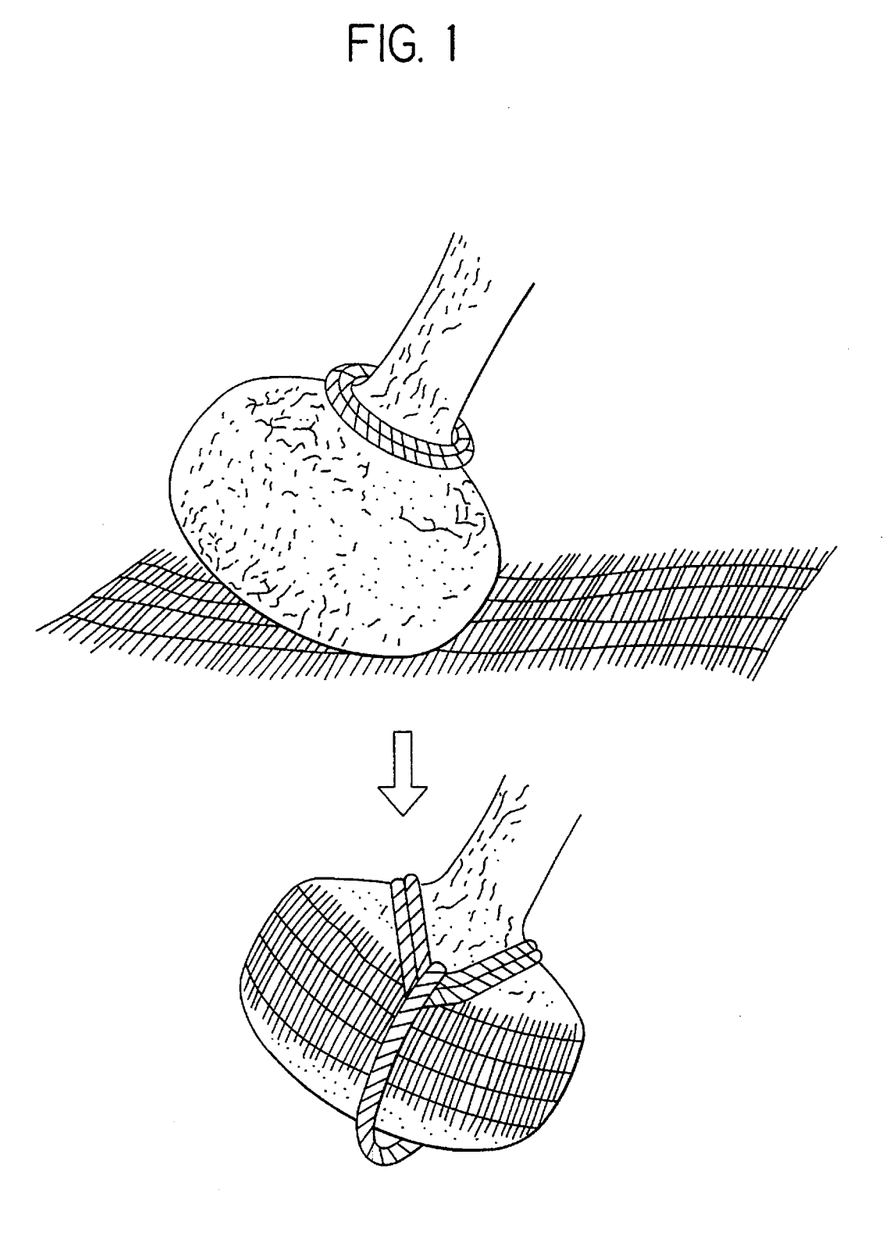
FIG. 1 is a perspective view describing the traditional method of enclosing and binding pot soil stuck to the roots of plants with ropes and straw matting.
Figure 2:
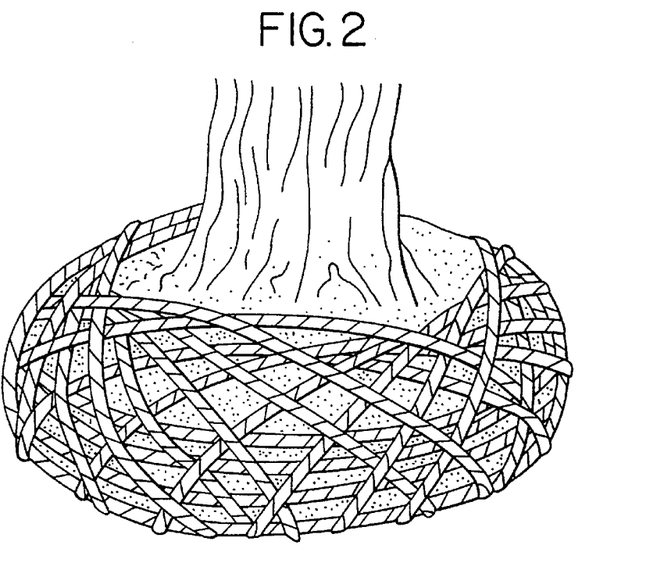
FIG. 2 is a perspective view describing the traditional state of pot soil stuck to the roots of plants and enclosed and bound with straw ropes.
Figure 3:
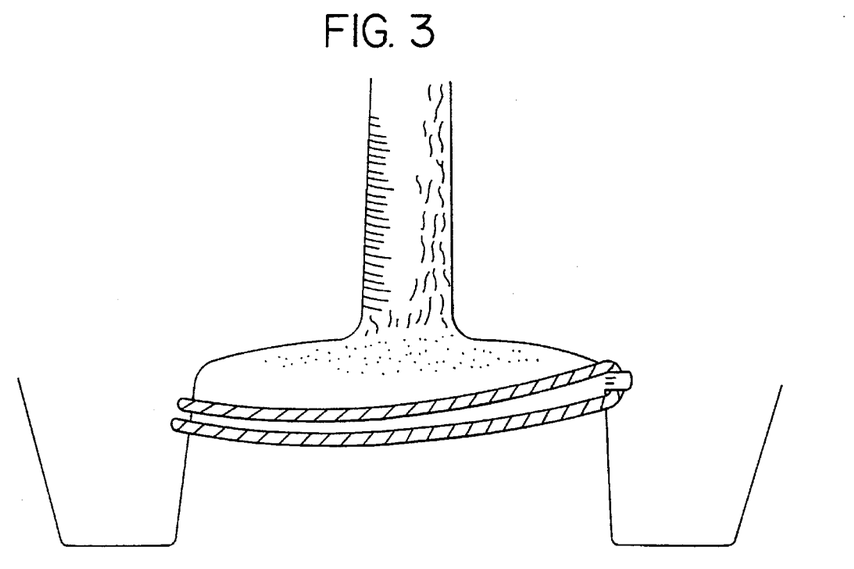
FIG. 3 is a perspective view describing the traditional method of enclosing and binding the pot soil stuck to the roots with straw ropes.

On the other hand, in the case of big or middle size trees, as shown in FIG. 1, the soil stuck to the roots are wrapped in hemp cloth, straw matting or straw and held in place with a coiled rope. Alternatively, as shown in FIG. 2, the pot soil stuck to the roots is held tightly by means of a straw rope would therearound so as to prevent the dropping off of the pot soil stuck to the roots. However, a selling point of big or middle size trees used as garden plants is the shape and roots of the trees. Even if the shape of the tree is good, if the chance of the tree taking root after transportation is poor, such trees have little value. Therefore, straw ropes are required to be wound evenly and tightly in order that the pot soil stuck to the roots will not crumble during transportation. If there is conveniently a thick root at the time when the straw ropes are wound therearound, the ropes can be wound around the root as a support. However, if there is no thick root, as shown in FIG. 3, the support is driven into the pot soil stuck to the roots and the straw ropes are wound therearound. All plants do not have the same size of pot soil stuck to the roots and the pot soil has various sizes and shapes. And the soil varies greatly in quality from sandy to clay. Therefore, it is very difficult to wind the straw ropes evenly and tightly to the roots in order that the pot soil stuck to the roots will not crumble. This requires considerable skill by workers.

Figure 4:
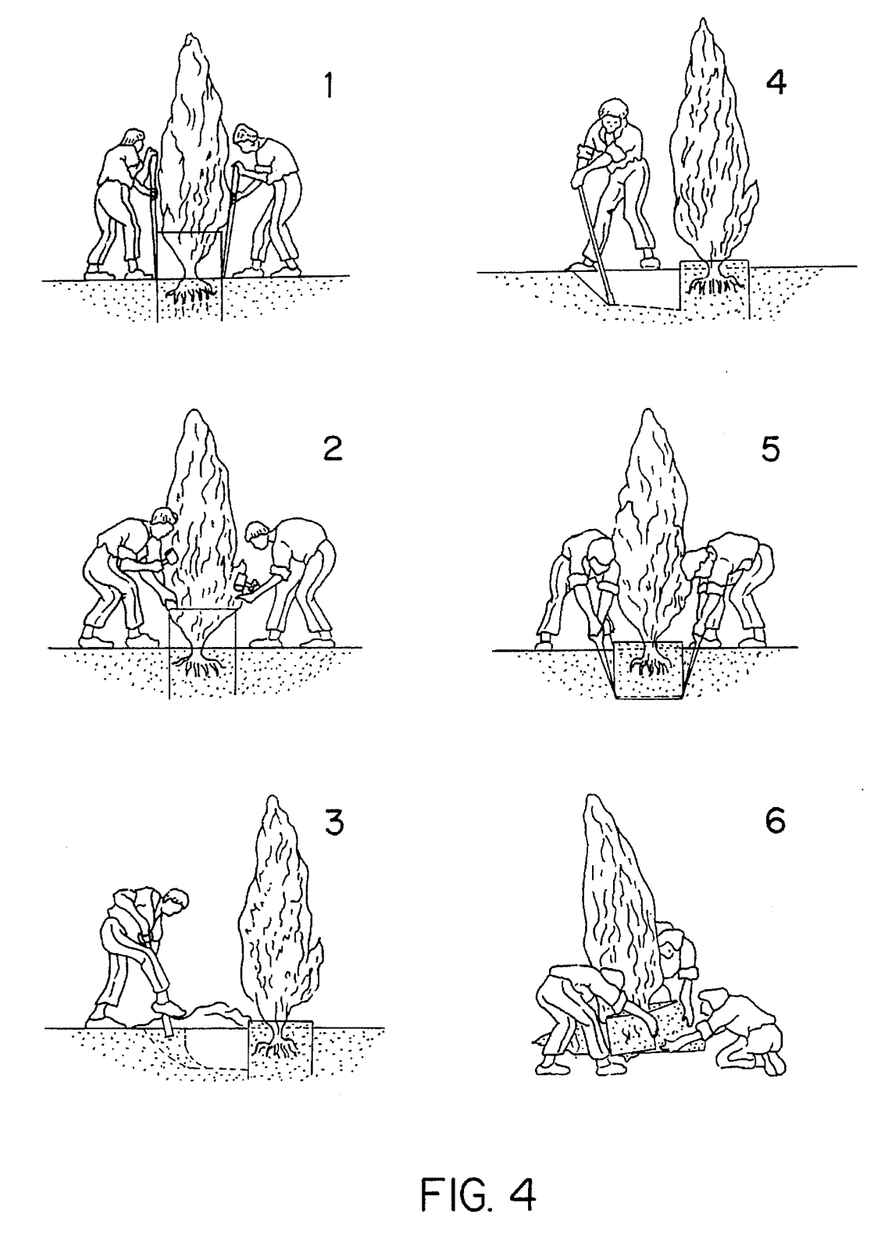
FIG. 4 is a perspective view of the procedure and the articles describing the board enclosure method for transplanting.

In some foreign countries, there is used the frozen soil method in which frozen land, like bedrock, is cut with a plow and the roots and the frozen soil are lifted as a unit and transported; the board enclosure method in which the roots are enclosed by a square or circle of boards (see FIG. 4); and the cloth winding method in which the pot is wrapped with cloth, wire and wire netting; and other methods. However, it is said that these methods are rough as a transportation technique and the above-mentioned method, which is used in Japan and peculiar to Japan, has the highest ratio of taking root of the plants.

The above-mentioned binding method with straw requires skill and time for wrapping and binding, but has the advantage of burying the straw with the root ball. On the other hand, the method of binding hemp cloth, straw matting and straw with a rubber band is very easy and has the advantage of drastically enhancing the binding efficiency. But there is the problem that it is very troublesome to remove the rubber band at the time of planting since the rubber band cannot be buried because of its slow rate of decay in soil.

As shown in FIG. 1 and 2, it is found that it is very easy to expand rubber tape, rubber net or binding cloth, which is interwoven or sewn with rubber thread, and bind the pot soil wrapped in hemp cloth, straw matting or straw by means of the elasticity of the rubber, instead of merely wrapping and binding the pot soil stuck to the roots with rope, hemp cloth, straw matting or straw. However, the rubber component decays more slowly in the soil than does hemp cloth, straw matting and straw and in view of the reduction in root taking and the reduction in growth of the root after transplanting, it is not desirable to bury the rubber in the soil as it is, as compared with the rope. However, if the rubber composition decays in the soil at the same rate as or more quickly than rope, hemp cloth, straw matting and straw, the entire binding would get loose spontaneously due to the elasticity of the rubber composition because the rubber binding articles expand and hold the pot soil stuck to the roots during transportation, with the result that the pot soil stuck to the roots can be buried within the soil without removal of the rope bindings.

Accordingly, an object of the present invention is to provide a rubber composition which decays in the soil.

Another object of the invention is to provide a rubber band, a rubber tape, a rubber thread, a rubber net or a binding cloth interwoven or sewn with rubber thread, which can be easily used to bind the pot soil, said rubber composition decaying in soil. Disclosure of the Invention The present invention was completed on the basis of the finding that, as a result of studying the decaying property of rubber products in soil, expanded rubber can be used to bind pot soil to the roots of plants and trees, because the rubber composition itself will decay and the water soluble additive which was contained in the rubber composition elutes into the soil due to the water contained in the soil. The result is that the rubber composition achieves a sponge-like state with a corresponding loss in tensile strength.

The present invention provides a rubber composition decayable in soil which comprises 3 to 70% by weight of a water soluble additive, which does not bind itself to the rubber component and thus elutes into the soil, and 97 to 30% by weight of a rubber composition.

The mixing proportion of the rubber composition and water soluble additives depends on a balance between the modulus, tensile strength or elongation (it should be able to expand by at least 2 or 3 times) of the rubber having a minimum binding force necessary to prevent the pot soil stuck to the roots of plants from crumbling during transportation and the decay rate (decay property after at least 7 months in soil) desired for enabling the plants to take root and grow after being transplanted. When a large elongation, strong modulus and tensile strength are required to bind the root ball, the amount of rubber in the composition is increased. On the other hand, in order to increase the decay rate, the ratio of the water soluble additive in the composition is made to be large. Depending on the kind of the water soluble additive, the mixing proportion of the rubber composition and the water soluble additive may be preferably adjusted on the basis of the minimum binding force necessary to prevent the pot soil stuck to the roots from crumbling during transportation. Advantageously, the property of the rubber has an elongation of three times in the state of binding and the decay rate of cleaving in 1 month.

Further, the decay rate in soil can be adjusted by adding a foaming agent to the rubber composition to form a foaming structure. In such a case, the mixing proportion of the rubber composition, the water soluble additive, and the foaming agent is preferably determined on the basis of the balance of modulus, tensile strength or elongation (capability to expand by at least 2 times) of the rubber property, which requires a minimum binding force necessary to prevent the pot soil stuck to the roots from crumbling during transportation, and a decay rate (the property to decay in at least 6 months) required for insuring the taking root and the growth of the root. It is usually preferable to add 1 to 5% by weight of the foaming agent to 97 to 30% by weight of the rubber composition, then to the resulting mixture, add 3 to 70% by weight of the water soluble additive. Since the crumbling of the pot soil stuck to the roots during transportation, which is a significant problem, can make the commodity value of a plant approach zero and also reduce the chance of the plant taking root after transplanting, a maximum binding property is required of the rubber to bind the pot soil stuck to the roots. Thus the foaming structure is subject to having a relatively low modulus, tensile strength and elongation to secure the desired property of the rubber in order to prevent the pot soil stuck to the roots from crumbling during transportation.

According to the present invention, the water soluble additive does not bond to the rubber component and is dispersed into the matrix of vulcanized rubber component, which constitutes the elastic body. Therefore, when buried in soil, the water soluble additive elutes from the elastic body based on the water content within the soil, and then the elastic body becomes porous. Since this elastic body is expanded and stretched so as to produce the binding force for enclosing and binding the pot soil stuck to the roots, the tensile strength before being buried in soil decreases extremely to cleavage and parting from the body.

The matrix of the vulcanized rubber component, which constitutes the elastic body, having a foaming structure, decays in the soil faster than that having a non-foaming structure. Moreover, since the water soluble additive does not bond to the rubber component and is dispersed, the water soluble additive elutes from the elastic body as a result of the water contained within the soil and the state of the foaming structure is beyond that before the burying of the elastic body in soil.

In order to promote the cleavage of said elastic body in the state of tension, the rubber component is preferably biodegradable in soil. Natural rubber and synthesized rubber which have a polyisoprene structure are preferably used as the rubber component. The main components of the natural rubber comprises hydrocarbon rubber, protein, fatty acid, sugar and ash content. Since a little oxygen, which oxides the rubber component to decay, is present and mold, actinomycete, bacteria act in soil, the rubber component can be decomposed and the rate of the decomposition depends on water content, temperature, pH, oxygen content and the types of other organisms within the soil. And biodegradable acrylic bisamide is preferably used together as an auxiliary curing agent, with the curing agent promoting the decay of the bridge structure of the rubber matrix in soil.

The natural rubber and synthesized rubber having an isoprene structure as the rubber component may be different types of polymers, i.e., solid, liquid and powder depending on the curing or molding method. The method of curing the rubber composition may include using vapor, electric heat, hot water, hot air, salt bath, radiation, and electromagnetic waves. The method of molding the rubber composition may include extrusion, immersion, molding and rolling.

The water soluble additive may be a water soluble substance which does not bind to the rubber component, but preferably a substance which has no harmful influence on the transplanting of young garden plants. The most preferable water soluble additive is a nitrogenous fertilizer, a water soluble phosphatic fertilizer and a water soluble potassium fertilizer which can enhance the success of young garden plants taking root and promote growth after transplanting. One, two or more water soluble additives are selected from the group comprising carboxymethylcellulose, casein, starch, lecithin, a water soluble polymer as a flocculent, water soluble nitrogenous fertilizer, water soluble phosphatic fertilizer and water soluble potassium fertilizer.

Lecithin exists in important organs of animals and plants in nature and fulfills an important function for life. It is contained in the yolk of an egg, the brain of an animal, in soybean seed and so on, and is extracted mainly from soybeans on an industrial or large scale.

And as a flocculent, a water soluble polymer, trade name Daiyaclear, manufactured by Mitsubishikasei Industrial Co., Ltd., obtained by polymerizing acrylic amide linearly can be used. Such a flocculent is used for the disposal of water for industrial use and town sewage.

As a water soluble nitrogenous fertilizer, ammonium sulfate, ammonium chloride, Chile saltpeter, ammonium nitrate, urea, lime nitrogen, lime nitrate and so on can be used.

As a water soluble phosphatic fertilizer, ammonium dihydrogenphosphate, calcium dihydrogenphosphate, calcium superphosphate, double superphosphate and so on can be used.

As a water soluble potassium fertilizer, potassium sulfate, potassium chloride, potassium sulfate magnesia, calcium corrosive acid, plant ash, compost and so on can be used.

Besides said water soluble additive, a soil modifier may also be added. As this soil modifier, a soil modifier containing bacteria, which has the capability to decompose organisms, for example, can oxide sulphur, may be used. This can promote the decay of the bridge structure of the rubber matrix crosslinked with sulphur. Also a soil modifier including Thomas bacteria, urea bacteria, Toricoderuma bacteria, cellulose decomposition bacteria, Kofuna bacteria and fungi bacteria may be used. And the water absorptive resin which is used as the soil modifier can be used.

As the foaming agent, an agent which can form foam sequentially may be preferably used and the concrete example thereof may include sodium bicarbonate. As a foaming method, a common curing method may be used.

Various articles binding pot soil which is stuck to the roots can be made using said rubber composition.

In view of the binding force of the pot soil stuck to the roots, the binding efficiency and the production cost, for young plants, a rubber band for binding the pot soil stuck to the roots of plants for transplanting, having a thickness of 0.15 to 10.0 mm, may be preferable. The rubber band can be produced according to the process comprising: adding 3 to 70% by weight of water soluble additive, which does not bond with the rubber component and elutes in the soil, to 97 to 30% by weight of the rubber composition having polyisoprene structure and missing them; extruding the resulting mixture composed of the rubber composition, which decay in the soil, into a tube; curing it; and cutting it into the desired width. On the other hand, if the band contains a foaming structure from the beginning, the band may preferably have a thickness of 0.5 to 60.00 mm.

The pot soil stuck to the roots has various shapes and qualities. Therefore, the expandable binding articles can be wound much easier than ropes and have more binding strength. Because of its low production cost, as a substitute for ropes for big or middle plants, the rubber tape for binding the pot soil stuck to the roots of the plants for transplanting, which has a thickness of 0.15 to 10.00 mm, may be preferable. The rubber tape can be produced according to the process comprising: adding 3 to 70% by weight of the water soluble additive, which does not bind to the rubber component and elutes in soil, to 97 to 30% by weight of the rubber composition having a polyisoprene structure and mixing them; extruding the resulting rubber mixture composed of the rubber composition, which decay in soil, into a tape; and curing and cutting it. The rubber tape for binding the pot soil stuck to the roots of the plants for transplanting, which has a thickness of 0.15 to 10.00 mm may be preferable, which is produced according to the process comprising: adding 3 to 70% by weight of the water soluble additive, which does not bind with the rubber component and elutes in soil, to 97 to 30% by weight of the rubber composition having a polyisoprene structure and mixing them; rolling the resulting mixture composed of the rubber composition, which decay in soil, into a sheet; curing it; and cutting it into the desired width. On the other hand, if the band has a foaming structure from the beginning, the band may preferably have a thickness of 0.5 to 60.00

Moreover, as a substitute for straw matting, a rubber net for binding the pot soil stuck to the roots of the plants for transplanting may be preferable, which is produced according to the process comprising: adding 3 to 70% by weight of the water soluble additive, which does not bond with the rubber component and elutes in soil, to 97 to 30% by weight of the rubber composition having a polyisoprene structure and mixing them; extruding the resulting mixture composed of the rubber composition, which decay in soil, into a rubber thread having a cross section of 0.02 to 100 mm$^2$ and curing it, or rolling or extruding the resulting mixture into a sheet, curing it and cutting it into a rubber thread having a cross section of 0.02 to 100 mm; and weaving the resulting rubber thread into a net. Alternatively, a cloth for binding the pot soil stuck to the roots of the plants for transplanting may be preferable, which is produced according to the process comprising: adding 3 to 70% by weight of the water soluble additive, which does not bond with the rubber component and elutes in soil, to 97 to 30% by, weight of the rubber composition having a polyisoprene structure and mixing them; extruding the resulting mixture composed of the rubber composition, which decay in soil, into a rubber thread having a cross section of 0.02 to 100 mm$^2$ and curing it, or rolling or extruding the resulting mixture into a sheet, curing it and cutting it into a rubber thread having a cross section of 0.02 to 100 mm; and interweaving or sewing the resulting rubber thread into suitable pieces of the cloth, which enclose the pot soil stuck to the roots, said cloth being made of vegetable fiber selected from hemp, cotton and coconut, animal fiber selected from sheep wool and silk, or regenerated fiber selected from rayon. Needless to say, a material having a foaming structure may be used.

The rubber thread may be more preferably a wrapped or braided rubber thread obtained by wrapping or braiding vegetable fiber selected from hemp, cotton and coconut, animal fiber selected from sheep wool and silk or regenerated fiber selected from rayon, around the said rubber thread elastically in view of the tearing or frictional strength of the binding rubber net or cloth.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

THE BEST MODE FOR CARRYING OUT THE INVENTION

The present invention will be more clearly understood with reference to the following examples:

Production Example 1 of the Rubber band:

Natural rubber mixture is prepared by mixing 67 parts by weight (the term "parts by weight" is expressed simply as "parts") of natural rubber, 20 parts of carboxymethylcellulose and 13 parts of a compounding agent including curing agent, vulcanization accelerator, processing retardant, vulcanization assistant, degradation inhibitor, processing assistant and coloring agent (expressed simply as "compounding agent"). The natural rubber mixture is extruded by an extruder and cured and the resulting tube is cut into a width of 13 mm, resulting in a rubber band having a minor diameter of 50.8 mm, a cutting width of 13 mm and a thickness of 1.0 mm.

This rubber band can expand by 6 times as long as at the beginning, and if the rubber is left in the soil for 1.5 months with a state of expansion of three times, it decayed and became parted.

Production Example 2 of the band

Natural rubber mixture is prepared by mixing 67 parts of natural rubber, 20 parts of carboxymethylcellulose, 11 parts of a compounding agent and 2 parts of a vulcanization assistant (acrylic bisamide). The rubber band is obtained from this mixture in the same way as Production Example 1. This rubber band can expand by 6 times as long as, at the beginning, and when the rubber band is left in the soil for 1 month, with the state of expansion of three times, it decayed and became parted.

Production Example 3 of the band

Polyisoprene-based synthesized natural rubber mixture is prepared by mixing 67 parts of polyisoprene-based synthesized natural rubber, 20 parts of carboxymethylcellulose and 13 parts of the compounding agent. The rubber band is obtained from this mixture in the same way as Production Example 1.

This rubber band can expand by 7 times as long as, at the beginning, and when the rubber band is left in the soil for 3 months, with the state of expansion of three times, it decayed and became parted.

Production Example 4 of the band

Natural rubber mixture is prepared by mixing 67 parts of natural rubber, 20 parts of cornstarch and 13 parts of the compounding agent. The rubber band is obtained from this mixture in the same way as Production Example 1.

This rubber band can expand by 6 times as long as, at the beginning, and when the rubber band is left in the soil for 6 months, with the state of expansion of three times, it decayed and became parted. Production Example 5 of the band Natural rubber mixture is prepared by mixing 67 parts of natural rubber, 20 parts of cornstarch, 11 parts of the compounding agent and 2 parts of vulcanization assistant (acrylic bisamide). The rubber band is obtained from this mixture in the same way as Production Example 1.

This rubber band can expand by 6 times as long as, at the beginning, and when the rubber band is left in the soil for 6 months, with the state of expansion of three times, it decayed and became parted.

Production Example 6 of the band

Polyisoprene-based synthesized natural rubber mixture is prepared by mixing 67 parts of polyisoprene-based synthesized natural rubber, 20 parts of cornstarch and 13 parts of the compounding agent. The rubber band is obtained from this mixture in the same way as Production Example 1.

This rubber band can expand by 7 times as long as, at the beginning, and when the rubber band is left in the soil for 7 months with the state of expansion of three times, it decayed and became parted.

Production Example 7 of the band

Natural rubber mixture is prepared by mixing 67 parts of natural rubber, 20 parts of coagulant (Diaclear: manufactured by Mitsubishikasei Co., Ltd.) and 13 parts of the compounding agent. The rubber band is obtained from this mixture in the same way as Production Example 1.

This rubber band can expand by 5 times as long as, at the beginning, and when the rubber band is left in the soil for 3 months with the state of expansion of three times, it decayed and became parted.

Production Example 8 of the band

Natural rubber mixture is prepared by mixing 67 parts of natural rubber, 20 parts of coagulant (Diaclear: manufactured by Mitsubishikasei Co., Ltd.), 11 parts of compounding agent and 2 parts of vulcanization agent (acrylic bisamide). The rubber band is obtained from this mixture in the same way as Production Example 1.

This rubber band can expand by 5 times as long as, at the beginning, and when the rubber band is left in the soil for 2.5 months with the state of expansion of three times, it decayed and became parted.

Production Example 9 of the band

Polyisoprene-based synthesized natural rubber mixture is prepared by mixing 67 parts of polyisoprene-based synthesized natural rubber, 20 parts of coagulant (Diaclear: manufactured by Mitsubishikasei Co., Ltd.) and 13 parts of compounding agent. The rubber band is obtained from this mixture in the same way as Production Example 1.

This rubber band can expand by 6 times as long as, at the beginning, and when the rubber band is left in the soil for 5 months with a state of expansion of three times, it decayed and became parted.

Production Example 10 of the band

Natural rubber mixture is prepared by mixing 67 parts of natural rubber, 20 parts of water soluble mixed fertilizer (9 parts of ammonium sulfate, 2 parts of calcium superphosphate and 9 parts of potassium sulfate) and 13 parts of the compounding agent. The rubber band is obtained from this mixture in the same way as Production Example 1.

This rubber band can expand by 5 times as long as, at the beginning, and when the rubber band is left in the soil for 1.5 months with a state of expansion of three times, it decayed and became parted.

Production Example 11 of the band

Natural rubber mixture is prepared by mixing 67 parts of natural rubber, 20 parts of water soluble mixed fertilizer (9 parts of ammonium sulfate, 2 parts of calcium superphosphate and 9 parts of potassium sulfate), 11 parts of compounding agent and 2 parts of vulcanization assistant (acrylic bisamide). The rubber band is obtained from this mixture in the same way as Production Example 1.

The rubber band can expand by 5 times as long as, at the beginning, and when the rubber band is left in the soil for 1 month with the state of expansion of three times, it decayed and became parted.

Production Example 12 of the band

Polyisoprene-based synthesized natural rubber mixture is prepared by mixing 67 parts of polyisoprene-based synthesized natural rubber, 20 parts of water soluble mixed fertilizer (9 parts of ammonium sulfate, 2 parts of calcium superphosphate and 9 parts of potassium sulfate) and 13 parts of the compounding agent. The rubber band is obtained from this mixture in the same way as Production Example 1.

This rubber band can expand by 6 times as long as, at the beginning, and when the rubber band is left in the soil for 3 months with the state of expansion of three times, it decayed and became parted.

Production Example 13-1 of the band

Polyisoprene-based natural rubber mixture is prepared by mixing 67 parts of polyisoprene-based synthesized natural rubber, 20 parts of water soluble fertilizer (ammonium sulfate) and 13 parts of a compounding agent. The resulting rubber is extruded by an extruder and cured. Then, the tube with a circumference of 160 mm is cut into a width of 130 mm and the tubes with circumferences of 200 mm and 240 mm are cut into a width of 15 mm, resulting in three kinds of rubber bands having a thickness of 1.0 mm.

This rubber band can expand by 6 times as long as, at the beginning, and when the rubber band is left in the soil for 3 months with the state of expansion of three times, it decayed and became parted.

Production Example 13-2 of the band

Natural rubber mixture is prepared by mixing 67 parts of natural rubber, 20 parts of water soluble fertilizer (ammonium sulfate) and 13 parts of a compounding agent. The resulting rubber is extruded by an extruder and cured. Then, the tube with a circumference of 160 mm is cut into a width of 130 mm and the tubes with circumferences of 200 mm and 240 mm are cut into a width of 15 mm, resulting in three kinds of rubber bands having a thickness of 1.0 mm.

This rubber band can expand by 6 times as long as, at the beginning, and when the rubber band is left in the soil for 3 months with the state of expansion of three times, it decayed and became parted.

Production Example 14 of the band

Natural rubber mixture is prepared by mixing 67 parts of natural rubber, 20 parts of lecithin and 13 parts of a compounding agent. The rubber band is obtained from this mixture in the same way as Production Example 1.

This rubber band can expand by 6 times as long as, at the beginning, and when the rubber band is left in the soil for 2 months with the state of expansion of three times, it decayed and became parted.

Production Example 15 of the band

Natural rubber mixture is prepared by mixing 67 parts of natural rubber, 20 parts of lecithin, 11 parts of a compounding agent and 2 parts of vulcanization assistant (acrylic bisamide). The rubber band is obtained from this mixture in the same way as Production Example 1.

This rubber band can expand by 6 times as long as, at the beginning, and when the rubber band is left in the soil for 1.5 months with the state of expansion of three times, it decayed and became parted.

Production Example 16 of the band

Polyisoprene-based synthesized natural rubber mixture is prepared by mixing 67 parts of polyisoprene-based synthesized natural rubber, 20 parts of lecithin and 13 parts of a compounding agent. The rubber band is obtained from this mixture in the same way as Production Example 1.

This rubber band can expand by 7 times as long as, at the beginning, and when the rubber band is left in the soil for 3.5 months with the state of expansion of three times, it decayed and became parted.

Production Example 17 of the band

Natural rubber mixture is prepared by mixing 67 parts of natural rubber, 20 parts of casein and 13 parts of a compounding agent. The rubber band is obtained from this mixture in the same way as Production Example 1.

This rubber band can expand by 6 times as long as, at the beginning, and when the rubber band is left in the soil for 2.5 months with the state of expansion of three times, it decayed and became parted.

Production Example 18 of the band

Natural rubber mixture is prepared by mixing 67 parts of natural rubber, 20 parts of casein, 11 parts of a compounding agent and 2 parts of vulcanization assistant (acrylic bisamide). The rubber band is obtained from this mixture in the same way as Production Example 1.

This rubber band can expand by 6 times as long as, at the beginning, and when the rubber band is left in the soil for 1.5 months with the state of expansion of three times, it decayed and became parted.

Production Example 19 of the band

Polyisoprene-based synthesized natural rubber mixture is prepared by mixing 67 parts of polyisoprene-based synthesized natural rubber, 20 parts of casein and 13 parts of a compounding agent. The rubber band is obtained from this mixture in the same way as Production Example 1.

This rubber band can expand by 7 times as long as, at the beginning, and when the rubber band is left in the soil for 3.5 months with the state of expansion of three times, it decayed and became parted.

Production Example 20 of the band

Natural rubber mixture is prepared by mixing 67 parts of natural rubber, 18 parts of cornstarch, 2 parts of soil modifier (Uron C: manufactured by Tsurumi soda) and 13 parts of a compounding agent. The rubber band is obtained from this mixture in the same way as Production Example 1.

This rubber band can expand by 6 times as long as, at the beginning, and when the rubber band is left in the soil for 10 months with the state of expansion of three times, it decayed and, became parted.

Production Example 21 of the band

Natural rubber mixture is prepared by mixing 67 parts of natural rubber, 18 parts of cornstarch, 2 parts of soil modifier (UronC: manufactured by Tsurumi soda), 11 parts of a compounding agent and 2 parts of vulcanization assistant (acrylic bisamide). The rubber band is obtained from this mixture in the same way as Production Example 1.

This rubber band can expand by 6 times as long as, at the beginning, and when the rubber band is left in the soil for 5.5 months with the state of expansion of three times, it decayed and became parted.

Production Example 22 of the band

Polyisoprene-based synthesized natural rubber mixture is prepared by mixing 67 parts of polyisoprene-based synthesized natural rubber, 18 parts of cornstarch, 2 parts of soil modifier (Uron C: manufactured by Tsurumi soda) and 13 parts of a compounding agent. The rubber band is obtained from this mixture in the same way as Production Example 1.

This rubber band can expand by 7 times as long as, at the beginning, and when the rubber band is left in the soil for 6.5 months with the state of expansion of three times, it decayed and became parted.

Production Examples 1 to 22 of the rubber tape

The rubber mixture produced according to said Examples 1 to 22 of the rubber band was rolled and molded, then cured. The resulting sheet was cut into a rubber tape having a cutting width of 13 mm and a thickness of 1.0 mm. The elasticity of said rubber tape is equal to that of the rubber band.

The rubber tape was used as a substitute for the rope to enclose and bind the pot soil stuck to the roots of the plant and buried in the soil. The decay rate of said rubber at the state of the expansion of three times is equal to that of the rubber band.

Production Examples 1 to 22 of the rubber thread

The rubber mixture produced according to said Examples 1 to 22 of the rubber band was molded and then cured. The resulting sheet was cut into a rubber thread having a cutting width of 1.0 mm and a thickness of 1.0 mm. And said rubber body was extruded and then cured with the result that the rubber thread with 1.0 mm$^2$ was produced. The elasticity thereof is equal to that of the rubber band.

The rubber thread was woven up into the rubber net and the resulting rubber net was used as a substitute of the straw matting to enclose and bind the pot soil stuck to the roots of the plants and buried in the soil The decay rate at the state of the expansion of three times was confirmed to be equal to said rubber band and rubber tape.

Production Examples 23 to 45 of the rubber thread

The rubber thread produced using the rubber mixture made according to Production Examples 1 to 22 of the rubber thread was wrapped by a covering machine or braided by a braiding machine with the cotton thread of No. 30. The resulting rubber thread was woven up into the rubber net and said rubber net was used as a substitute for the straw matting to enclose and bind the pot soil stuck to the roots of the plants and buried in the soil. The decay rate at the state of the expansion of three times was slower than that of said rubber band, rubber tape and rubber net because the thread was wrapped and braided with the cotton thread in view of tear and friction strength, at the time of the binding. Production Examples 1 to 22 of the rubber sheet The rubber mixture produced according to Production Examples 1 to 22 of the rubber band was rolled and molded, then cured, resulting in the rubber sheet having a thickness of 1.0 mm and a width of 880 mm. The elasticity thereof is equal to that of the rubber band. The rubber sheet was used as a substitute of the straw matting to enclose and bind the pot soil stuck to the roots of the plants and buried in the soil.

The decay rate at the state of the expansion of three times was confirmed to be equal to said rubber band, rubber tape and rubber net.

Production Example 1 of the foam rubber band

Natural rubber mixture is prepared by mixing 32 parts of natural rubber, 20 parts of carboxymethylcellulose, 13 parts of a compounding agent, 5 parts of a foaming agent and 30 parts of filler. The resulting mixture was extruded with an extruder and cured. The resulting tube was cut into a cutting width of 13.00 mm, resulting in the foam rubber band having a minor diameter of 50.8 mm, a cutting width of 13.0 mm and a thickness of 4.0 mm.

This rubber band can expand by 2 times as long as, at the beginning, and when the rubber band was left in the soil for 1.3 months with the state of expansion of 1.5 times, it will decay and become parted.

Production Example 2 of the foam rubber band

Natural rubber mixture is prepared by mixing 36 parts of natural rubber, 20 parts of carboxymethylcellulose, 13 parts of a compounding agent, 1 part of a foaming agent and 30 parts of filler. The resulting mixture was extruded with an extruder and cured. The resulting tube was cut into a cutting width of 13.00 mm, resulting in the foam rubber band having a minor diameter of 50.8 mm, a cutting width of 13.0 mm and a thickness of 4.0 mm.

This rubber band can expand by 4 times as long as, at the beginning, the decay rate thereof at the state of expansion of 1.5 times in soil was confirmed to be slower by about 12% than the foam rubber band in Production Example 1.

Production Example 3 of the foam rubber band

A natural rubber mixture is prepared by mixing 32 parts of natural rubber, 20 parts of carboxymethylcellulose, 11 parts of a compounding agent, 2 parts of vulcanization assistant (acrylic bisamide), 5 parts of foaming agent and 30 parts of filler. The rubber band was obtained from said natural rubber mixture in the same way as Production Example 1 of the foam rubber band.

This rubber band can expand 2 times as long as, at the beginning, and when the rubber band is left in the soil with the state of expansion of 1.5 times for 1 month, it decayed and became parted.

Production Example 4 of the foam rubber band

Polyisoprene-based synthesized natural rubber mixture is prepared by mixing 32 parts of polyisoprene-based synthesized natural rubber, 20 parts of carboxymethylcellulose, 13 parts of a compounding agent, 5 parts of foaming agent and 30 parts of filler. The rubber band was obtained from said natural rubber mixture in the same was as Production Example 1 of the foam rubber band.

This rubber band can expand by 2 times as long as, at the beginning, and when the rubber band was left in the soil for 2.5 months with the state of expansion of 1.5 times, it decayed and became parted.

Production Example 5 of the foam rubber band

Natural rubber mixture is prepared by mixing 32 parts of natural rubber, 20 parts of cornstarch, 13 parts of a compounding agent, 5 parts of foaming agent and 30 parts of filler. The rubber band is obtained from said natural rubber mixture in the same way as Production Example 1 of the foam rubber band.

This foam rubber band can expand by 2 times as long as, at the beginning, and when the rubber band was left in the soil 5.5 months with the state of expansion of 1.5 times, it decayed and became parted.

Production Example 6 of the foam rubber band

Natural rubber mixture is prepared by mixing 32 parts of natural rubber, 20 parts of carboxymethylcellulose, 11 parts of a compounding agent, 5 parts of foaming agent, 30 parts of filler and 2 parts of vulcanization assistant (acrylic bisamide). The rubber band is obtained from said natural rubber mixture in the same way as Production Example 1 of the foam rubber band.

This rubber band can expand by 2 times as long as, at the beginning, and when the rubber band was left in the soil for 5 months with the state of expansion of 1.5 times, it decayed and became parted.

Production Example 7 of the foam rubber band

Polyisoprene-based synthesized natural rubber mixture is prepared by mixing 32 parts of polyisoprene-based synthesized natural rubber, 20 parts of cornstarch, 13 parts of a compounding agent, 5 parts of foaming agent and 30 parts of filler. The rubber band was obtained from said mixture in the same way as Production Example 1 of the foam rubber band.

This rubber band can expand by 2 times as long as, at the beginning, and when the rubber band is left in the soil for 6 months with the state of expansion of 1.5 times, it decayed and became parted.

Production Example 8 of the foam rubber band

Natural rubber mixture is prepared by mixing 32 parts of natural rubber, 20 parts of coagulant (Diaclear: manufactured by Mitsubishikasei Co., Ltd.), 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 2.5 months with the state of expansion of 1.5 times, it decayed and became parted.

Production Example 9 of the foam rubber band

Natural rubber mixture is prepared by mixing 32 parts of natural rubber, 20 parts of coagulant (Diaclear: manufactured by Mitsubishikasei Co., Ltd.), 11 parts of a compounding agent, 2 parts of vulcanization assistant (acrylic bisamide), 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 2 months with the state of expansion of 1.5 times, it decayed and became parted.

Production Example 10 of the foam rubber band

Polyisoprene-based synthesized natural rubber mixture is prepared by mixing 32 parts of polyisoprene-based synthesized natural rubber, 20 parts of coagulant (Diaclear: manufactured by Mitsubishikasei Co., Ltd.), 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 4 months with the state of expansion of 1.5 times, it decayed and became parted.

Production Example 11 of the foam rubber band

Natural rubber mixture is prepared by mixing 32 parts of natural rubber, 20 parts of water soluble mixed fertilizer ( 9 parts of ammonium sulfate, 2 parts of calcium superphosphate and potassium sulfate), 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 1.2 months with the state of expansion of 1.5 times, it decayed and became parted.

Production Example 12 of the foam rubber band

Natural rubber mixture is prepared by mixing 32 parts of natural rubber, 20 parts of water soluble mixed fertilizer (9 parts of ammonium sulfate, 2 parts of calcium superphosphate and potassium sulfate), 11 parts of a compounding agent, 2 parts of vulcanization assistant (acrylic bisamide), 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 1 month with the state of expansion of 1.5 times, it decayed and became parted. Production Example 13 of the foam rubber band Polyisoprene-based synthesized natural rubber mixture is prepared by mixing 32 parts of polyisoprene-based synthesized natural rubber, 20 parts of water soluble mixed fertilizer (9 parts of ammonium sulfate, 2 parts of calcium superphosphate and potassium sulfate), 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 2.5 months with the state of expansion of 1.5 times, it decayed and became parted.

Production Example 14 of the foam rubber band

Natural rubber mixture is prepared by mixing 32 parts of natural rubber, 20 parts of lecithin, 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 1.5 months with the state of expansion of 1.5 times, it decayed and became parted. Production Example 15 of the foam rubber band Natural rubber mixture is prepared by mixing 32 parts of natural rubber, 20 parts of lecithin, 11 parts of a compounding agent, 2 parts of vulcanization assistant(acrylic bisamide), 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 1 month with the state of expansion of 1.5 times, it decayed and became parted.

Production Example 16 of the foam rubber band

Polyisoprene-based synthesized natural rubber mixture is prepared by mixing 32 parts of polyisoprene-based synthesized natural rubber, 20 parts of lecithin, 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 3 months with the state of expansion of 1.5 times, it decayed and became parted.

Production Example 17 of the foam rubber band

Natural rubber mixture is prepared by mixing 32 parts of natural rubber, 2.0 parts of casein, 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 1.5 months with the state of expansion of 1.5 times, it decayed and became parted.

Production Example 18 of the foam rubber band

Natural rubber mixture is prepared by mixing 32 parts of natural rubber, 20 parts of casein, 11 parts of a compounding agent, 2 parts of vulcanization assistant (acrylic bisamide), 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 1 month with the state of expansion of 1.5 times, it decayed and became parted.

Production Example 19 of the foam rubber band

Polyisoprene-based synthesized natural rubber mixture is prepared by mixing 32 parts of polyisoprene-based synthesized natural rubber, 20 parts of casein, 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 3 months with the state of expansion of 1.5 times, it decayed and became parted.

Production Example 20 of the foam rubber band

Natural rubber mixture is prepared by mixing 32 parts of natural rubber, 18 parts of cornstarch, 2 parts of soil modifier (Uron C: manufactured by Tsurumi soda), 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 5 months with the state of expansion of 1.5 times, it decayed and became parted.

Production Example 21 of the foam rubber band

Natural rubber mixture is prepared by mixing 32 parts of natural rubber, 18 parts of cornstarch, 2 parts of soil modifier (UronC: manufactured by Tsurumi soda), 11 parts of a compounding agent, 2 parts of vulcanization assistant (acrylic bisamide), 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 4.5 months with the state of expansion of 1.5 times, it decayed and became parted.

Production Example 22 of the foam rubber band

Polyisoprene-based synthesized natural rubber mixture is prepared by mixing 32 parts of polyisoprene-based synthesized natural rubber, 18 parts of cornstarch, 2 parts of soil modifier (Uron C: manufactured by Tsurumi soda), 13 parts of a compounding agent, 5 parts of foaming agent and 30 parts of filler. The rubber band was obtained from said natural rubber mixture in the same way as Production Example 1 of the foam rubber band.

This foam rubber band can expand by 2 times as long as, at the beginning, and when the rubber band was left in the soil for 5.5 months with the state of expansion of 1.5 times, it decayed and became parted.

Production of Examples 1 to 21 of the foam rubber tape

The rubber mixture produced according to said Examples 1 to 21 of the foam rubber band was rolled and molded, and then cured. The resulting foam sheet was cut into a rubber foam tape having a cutting width of 13 mm and a thickness of 1.0 mm. The elasticity thereof is equal to that of the foam rubber band. Said rubber tape was used as a substitute for the ropes to enclose and bind the pot soil stuck to the roots of the plants and buried in the soil.

The decay rate at the state of the expansion of 1.5 times was equal to that of the foam rubber band. Production Examples 1 to 21 of the foam rubber thread The rubber mixture produced according to said Examples 1 to 21 of the foam rubber band was rolled and molded, and then cured. The resulting sheet was cut into a foam rubber thread having a cutting width of 1.0 mm and a thickness of 1.0 mm. The elasticity thereof is equal to that of the foam rubber band. Said rubber thread was woven up into the foam rubber net and the resulting rubber net was used as a substitute of the straw matting to enclose and bind the pot soil stuck to the roots of the plants and buried in the soil.

The decay rate at the state of the expansion of 1.5 times was confirmed to be equal to said foam rubber band and rubber tape.

Production Examples 22 to 42 of the foam rubber thread

The foam rubber thread produced using the rubber mixture made according to said Production Examples 1 to 21 of the foam rubber thread was wrapped by a covering machine or braided by a braiding machine with the cotton thread of No. 30. The resulting foam rubber thread was woven up into the rubber net and said rubber net was used as a substitute of the straw matting to enclose and bind the pot soil stuck to the roots of the plants and buried in the soil.

The decay rate at the state of the expansion of 1.5 times was confirmed to be slower than that of said foam rubber band, rubber tape and rubber net because said thread was wrapped and braided with the cotton thread in view of tear and friction strength at the time of the binding.

Production Examples 1 to 21 of the foam rubber sheet

The rubber mixture produced according to said Examples 1 to 21 of the foam rubber band was rolled and molded, and then cured, resulting in a foam rubber sheet having a thickness of 1.0 mm and a width of 880 mm. The elasticity thereof is equal to that of the foam rubber band. Said rubber sheet was used as a substitute of the ropes to enclose and bind the pot soil stuck to the roots of the plants and buried in the soil.

The decay rate at the state of the expansion of 1.5 times was confirmed to be equal to said foam rubber band, rubber tape and rubber net.

Production Example of the foam rubber band, rubber tape, rubber thread and rubber sheet The foam body according to said Production Examples of the foam rubber band, rubber tape, rubber thread and rubber sheet was immersed in the aqueous solution of 9% ammonium sulfate, 1% calcium superphosphate and 10% potassium sulfate and dried. The elasticity of the resulting foam body is inferior to that of the foam rubber band by about 11%.

The decay rate at the state of the expansion of 1.5 times was confirmed to be equal to that of said Production Examples of the foam body.

Possibility of Utilization in Industry

The present invention provides rubber band, rubber tape and rubber net to enclose and bind the pot soil stuck to the roots of young, big or moderate plants during transplanting, using the rubber composition produced by adding 3 to 70 parts by weight of water soluble additive, which does not bond with the rubber component and elutes in soil, mixed to 97 to 30 parts by weight of the rubber component and mixing them. Therefore, the pot soil stuck to the roots of young, big or moderate plants during transplanting can be very easily bound, it needs no skill and the elastic stress of the rubber can prevent the pot soil stuck to the roots of the plants during transplanting from crumbling. Moreover, since the rubber binding article for enclosing and binding the pot soil stuck to the roots is in the state of expansion, even if said rubber itself does not decay at an early stage, the water soluble additive, which can elute in soil, elutes into the soil by the water contained within the soil and the article becomes porous with the result that the tensile strength is reduced and cleavage begins. Therefore, the ratio of taking root and growth of the root can be considered after transplanting when the binding of the pot soil stuck to the roots is removed and said rubber article can be buried into the soil as it is. And the water soluble additive which can elute into the soil may include a nutrient necessary for the plants, thereby, the ratio of taking root and growth of the root after transplanting can be further increased. Therefore, not only the problem of transplanting can be solved, but also the ratio of taking root can be increased.

Further, if the foaming agent is added to said rubber composition to form some foam structure from the beginning, the decay rate in soil can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rubber composition decayable in soil which consists essentially of 97 to 30 parts by weight of a rubber component and 3 to 70 parts by weight of a water soluble additive which does not bind to the rubber component and can elute into the soil, used together with acrylic bisamaide, biodegradable as a curing agent.

2. The rubber composition decayable in soil according to claim 1 wherein said rubber component includes natural rubber or synthetic rubber having a polyisoprene structure as the rubber component.

3. The rubber mixture composition decayable in soil according to claim 1 further containing a foaming agent.

4. The rubber composition according to claim 1 wherein said water soluble additive is at least one member selected from the group consisting of carboxymethylcellulose, casein, starch, a flocculant, water soluble nitrogenous fertilizer, water soluble phosphatic fertilizer and water soluble potassium fertilizer.

5. The rubber composition according to claim 1 further comprising a bacteria-containing soil modifier.

6. A rubber band for binding pot soil stuck to plants for transplanting which has a thickness of 0.15 to 10.0 mm, produced according to the process which comprises:

adding 3 to 70 parts by weight of a water soluble additive, which does not bond with the rubber component and can elute into soil, to 97 to 30 parts by weight of a rubber component having a polyisoprene structure and mixing them, extruding or soaking or molding the resulting mixture, which can decay in soil, into a tube, and cutting it into a desired width after curing.

7. A rubber tape for binding pot soil stuck to the roots of plants for transplanting, which has a thickness of 0.15 to 1.0 mm, produced according to the process which comprises:

adding 3 to 70 parts by weight of a water soluble additive, which does not bond with the rubber component and can elute into soil, to 97 to 30 parts by weight of a rubber component having a polyisoprene structure and mixing them, extruding or molding the resulting mixture, which decays in soil, into a tape, and curing it.

8. A rubber ring for binding the pot soil stuck to the roots of plants for transplanting, which has a thickness of 0.15 to 1.0 mm, produced according to the process which comprises:

adding 3 to 70 parts by weight of a water soluble additive, which does not bond with the rubber component and can elute into soil, to 97 to 30 parts by weight of a rubber component having a polyisoprene structure, extruding or molding the resulting mixture composed of rubber component, which decays in soil, into a tape, curing it, then, cutting it into a desired length, and making it into a ring by gluing or tying.

9. A rubber tape for binding pot soil stuck to the roots of plants for transplanting, which has a thickness of 0.15 to 140 mm, produced according to the process which comprises:

adding 3 to 70 parts by weight of a water soluble additive, which does not bond with the rubber component and can elute into soil, to 97 to 30 parts by weight of the rubber compound having a polyisoprene structure, rolling, extruding or molding the resulting mixture, which decays in soil, into a sheet, curing it, and cutting it into rubber tapes having a desired width.

10. A rubber ring for binding pot soil stuck to the roots of plants for transplanting, which has a thickness of 0.15 to 1.0 mm, produced according to the process which comprises:

adding 3 to 70 parts by weight of a water soluble additive, which does not bond with the rubber component and can elute into soil, to 97 to 30 parts by weight of the rubber component having a polyisoprene structure and mixing them, rolling, extruding or molding the resulting mixture, which decays in soil, into a sheet, curing the sheet, then cutting the sheet into a desired width, making it into a tube by gluing, and cutting the tube into a ring, or cutting the sheet into a desired length, and making it into a ring by tying.

11. A rubber thread for binding pot soil stuck to the roots of plants for transplanting, produced according to the process which comprises:

adding 3 to 70 parts by weight of a water soluble additive, which does not bond with the rubber component and can elute into soil, to 97 to 30 parts by weight of the rubber component having a polyisoprene structure and mixing them, extruding or molding the resulting mixture, which can decay in soil, into a rubber thread having a cross section of 0.02 mm to 100 mm$^2$ and then curing it 12. A rubber ring for binding pot soil stuck to the roots of plants for transplanting, produced according to the process which comprises:

adding 3 to 70 parts by weight of a water soluble additive, which does not bond with the rubber component and can elute into the soil, to 97 to 30 parts by weight of the rubber component having a polyisoprene structure, extruding or molding the resulting mixture, which can decay in soil, into a rubber thread having a cross section of 0.02 to 100 mm$^2$, curing it, then cutting it into the desired length, and gluing or tying it into a ring.

13. A rubber thread for binding pot soil stuck to the roots of plants for transplanting, produced according to the process which comprises:

adding 3 to 70 parts by weight of a water soluble additive, which does not bond with the rubber component and can elute into soil, to 97 to 30 parts by weight of the rubber component having a polyisoprene structure and mixing them, rolling, extruding or molding the resulting mixture, which can decay in soil, into a sheet, curing the sheet, then cutting it into a rubber thread having a cross section of 0.02 to 100 mm$^2$.

14. A rubber ring for binding pot soil struck to the roots of plants for transplanting, produced according to the process which comprises:

adding 3 to 70 parts by weight of a water soluble additive, which does not bond with the rubber component and can elute into soil, to 97 to 30 parts by weight of the rubber component having a polyisoprene structure and mixing them, rolling, extruding or molding the resulting mixture, which can decay in soil, into a sheet, curing the sheet, then cutting it into a thread having a cross section of 0.02 to 100 mm$^2$ further cutting the thread into the desired length, and making it into a ring by gluing or tying.

15. A rubber sheet for binding pot soil stuck to the roots of plants for transplanting, produced according to the process which comprises:

adding 3 to 70 parts by weight of a water soluble additive, which does not bond with the rubber component and can elute into soil, to 97 to 30 parts by weight of the rubber component having a polyisoprene structure and mixing them, rolling, extruding or molding the resulting mixture, which can decay in soil, into a sheet having a thickness of 0.15 to 50 mm, and curing it.

16. A rubber net for binding pot soil stuck to the roots of plants for transplanting, produced according to the process which comprises:

adding 3 to 70 parts by weight of a water soluble additive, which does not bond with the rubber component and can elute into soil, up to 97 to 30 parts by weight of the rubber component having a polyisoprene structure and mixing them, extruding or molding the resulting mixture, which can decay in soil, into a rubber thread having a cross section of 0.02 to 100 mm$^2$, curing it, and weaving the resulting rubber thread into a net.

17. A rubber net for binding roots of the plants for transplanting produced according to the process which comprises:

adding 3 to 70 parts by weight of a water soluble additive, which does not bond with the rubber component and can elute into soil, to 97 to 30 parts by weight of rubber component having a polyisoprene structure and mixing them, rolling, extruding or molding the resulting mixture which can decay in soil, into a rubber sheet, curing the sheet, then cutting it into a rubber thread having a cross section of 0.02 to 100 mm$^2$, and weaving the resulting rubber thread into a net.

18. A rubber net for binding pot soil stuck to the roots of plants for transplanting according to claim 16 or 17 wherein said rubber thread is wrapped or braided elastically around the circumference thereof with vegetable fiber thread selected from hemp, cotton and coconut, animal fiber thread selected from sheep wool and silk or regenerated fiber thread selected from rayon, resulting in a wrapped or braided rubber thread.

19. A rubber cloth for binding a pot soil stuck to the roots of plants for transplanting, produced according to the process which comprises:

adding 3 to 70 parts by weight of a water soluble additive, which does not bond with the rubber component and can elute into soil, to 97 to 30 parts by weight of rubber component having a polyisoprene structure and mixing them, extruding or molding the resulting mixture, which can decay in soil, into a rubber thread having a cross section of 0.02 to 100 mm$^2$, curing it, and interweaving or sewing the resulting rubber thread into suitable places of the cloth, which is used to enclose the pot soil, made of vegetable fiber thread selected from hemp, cotton and coconut, animal fiber thread selected from sheep wool and silk or regenerated fiber thread selected from rayon.

20. A rubber cloth for binding pot soil stuck to the roots of plants for transplanting produced according to the process which comprises:

adding 3 to 70 parts by weight of a water soluble additive, which does not bond with the rubber component and can elute into soil, to 97 to 30 parts by weight of the rubber component having a polyisoprene structure and mixing them, rolling, extruding or molding the resulting mixture which can decay in soil, into a sheet, curing the sheet, cutting it into a rubber thread having a cross section of 0.02 to 100 mm$^2$, and interweaving or sewing the resulting rubber thread into suitable places of the cloth, which is used to enclose the pot soil, made of vegetable fiber thread selected from hemp, cotton and coconut, animal fiber thread selected from sheep wool and silk or regenerated fiber thread selected from rayon.

21. A rubber cloth for binding pot soil stuck to the roots of plants for transplanting according to claim 19 or 20 wherein said rubber thread is wrapped or braided elastically around the circumference thereof with vegetable fiber thread selected from hemp, cotton and coconut, animal fiber thread selected from sheep wool and silk or regenerated fiber thread selected from rayon, resulting in a wrapped or braided rubber thread.

22. A foam rubber band for binding pot soil stuck to the roots of plants for transplanting, which has a thickness of 0.5 to 60 mm, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding, immersing or molding the resulting mixture composed of the foam rubber component, which can decay in soil, into a tube, curing the tube, and cutting it into foam rubber bands having a desired width.

23. A foam rubber tape for binding pot soil stuck to the roots of plants for transplanting, which has a thickness of 0.5 to 60 mm, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding or molding the resulting mixture composed of the foam rubber component, which can decay in soil, into a tape, and curing it.

24. A foam rubber ring for binding pot soil stuck to the roots of plants for transplanting, which has a thickness of 0.5 to 60 mm, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding or molding the resulting mixture composed of the foam rubber component, which can decay in soil, into a tape, curing the tape, then cutting it into the desired length, and making it into a ring by gluing or tying.

25. A foam rubber ring for binding pot soil stuck to the roots of plants for transplanting, which has a thickness of 5 to 60 mm, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, rolling, extruding or molding the resulting mixture composed of the foam rubber component, which can decay in soil, into a sheet, curing the sheet, then cutting it into foam rubber rings having a desired length.

26. A foam rubber ring for binding pot soil stuck to the roots of plants for transplanting, which has a thickness of 0.5 to 60 mm, produced according to the process which comprises:

adding 3 to 70 parts by weight of a water soluble additive, which does not bond with the rubber component and can elute into soil, and 1 to 5 parts by weight of a foaming agent to 97 to 30 parts by weight of a rubber component and mixing them, rolling, extruding or molding the resulting mixture composed of the foam rubber component, which decays into soil, into a sheet, curing the sheet, then cutting it into the desired width, and gluing it into a tube and cutting it into the desired width, or cutting the sheet into foam rubber rings having a desired length and tying it.

27. A foam rubber thread for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding or molding the resulting mixture composed of the foam rubber component, which decays in soil, into a foam rubber thread having a cross section of 0.02 to 100 mm$^2$ and curing it.

28. A foam rubber ring for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding or molding the resulting mixture composed of the foam rubber component, which decays in soil, into a rubber thread having a cross section of 0.02 to 100 mm$^2$ and curing it, cutting the thread into the desired length, and making it into a ring by gluing or tying.

29. A foam rubber thread for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, rolling, extruding or molding the resulting mixture composed of the foam rubber component, which decays in soil, into a sheet and curing it, and cutting it into a rubber thread having a cross section of 0.02 to 100 mm$^2$.

30. A foam rubber ring for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, rolling, extruding or molding the resulting mixture composed of the foam rubber component, which decays in soil, into a sheet and curing it, cutting the sheet into a rubber thread having a cross section of 0.02 to 100 mm$^2$, cutting the thread into the desired length, and making it into a ring by gluing or tying.

31. A foam rubber sheet binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, rolling, extruding or molding the resulting mixture composed of the foam rubber component, which decays in soil, into a sheet having a thickness of 0.5 to 60 mm, and curing it.

32. A foam rubber net for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding or molding the resulting mixture composed of the foam rubber component, which decays in soil, into a rubber thread having a cross section of 0.02 to 100 mm$^2$, curing it, and weaving up the resulting foam rubber thread into a net.

33. A foam rubber net for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, rolling, extruding or molding the resulting mixture composed of a foam rubber component, which decays in soil, into a sheet, curing it, then cutting the sheet into a rubber thread having a cross section of 0.02 to 100 mm$^2$, and weaving up the resulting foam rubber thread into a net.

34. A rubber net for binding pot soil stuck to the roots of plants for transplanting according to claim 32 or 33 wherein said foam rubber thread is wrapped or braided elastically around the circumference thereof with vegetable fiber thread selected from hemp, cotton and coconut, animal fiber thread selected from sheep wool and silk or regenerated fiber thread selected from rayon, resulting in a wrapped or braided rubber thread.

35. A foam rubber cloth for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, extruding or molding the resulting mixture composed of the foam rubber component, which decays in soil, into a rubber thread having a cross section of 0.02 to 100 mm$^2$, curing it, interweaving or sewing the resulting foam rubber thread into suitable places of the cloth, which is used for binding the pot soil stuck to the roots of plants, said cloth being made of vegetable fiber selected from hemp, cotton and coconut, animal fiber selected from sheep wool and silk or regenerated fiber selected from rayon.

36. A foam rubber cloth for binding pot soil stuck to the roots of plants for transplanting, produced according to the process which comprises:

adding 3 to 70 parts by weight of a water soluble additive, which does not bond with the rubber component and can elute into soil, and 1 to 5 parts by weight of a foaming agent to 97 to 30 parts by weight of the rubber component and mixing them, rolling, extruding or molding the resulting mixture composed of the foam rubber component, which decays in soil, into a sheet, curing the sheet, then cutting it into a rubber thread having a cross section of to 100 mm², interweaving or sewing the resulting foam rubber thread into suitable places of the cloth, which is used for binding the pot soil stuck to the roots of plants, said cloth being made of vegetable fiber selected from hemp, cotton and coconut, animal fiber selected from sheep wool and silk or regenerated fiber selected from rayon.

37. A rubber net for binding pot soil stuck to the roots of plants for transplanting according to claim 32 or 33 wherein said rubber thread is wrapped or braided elastically around the circumference thereof with vegetable fiber thread selected from hemp, cotton and coconut, animal fiber thread selected from sheep wool and silk or regenerated fiber thread selected from rayon, resulting in a wrapped or braided foam rubber thread.

38. A rubber composite which is biodegradable in soil and is used to hold pot soil to the roots of plants to facilitate transplanting, which consists essentially of:

a natural or synthetic rubber component, and a water soluble additive which does not bind to the rubber component and thus can elute into the soil.

39. The rubber composite of claim 38, wherein the rubber component is present in an amount of 97 to 30 parts by weight and the water soluble additive is present in an amount of 3 to 70 parts by weight.

40. The rubber composite of claim 38, wherein the rubber component has a polyisoprene structure.

41. The rubber composite of claim 38, further containing 1 to 5 parts by weight of a foaming agent.

42. The rubber composite of claim 38 in the form of a rubber band, a rubber tape, a rubber ring, a rubber thread, a rubber net, a binding cloth interwoven with rubber thread, a rubber sheet, and a rubber cloth.

43. The rubber composite of claim 41 in the form of a foam rubber band, a foam rubber tape, a foam rubber ring, a foam rubber thread, a foam rubber net, a binding cloth interwoven with foam rubber thread, a foam rubber sheet, and a foam rubber cloth.

* * * * *